United States Patent
Chen

(10) Patent No.: US 7,166,550 B2
(45) Date of Patent: Jan. 23, 2007

(54) CERAMIC COMPOSITE BODY OF SILICON CARBIDE/BORON NITRIDE/CARBON

(76) Inventor: Xin Chen, 20678 Laurel Dr., Deer Park, IL (US) 60010

( * ) Notice: Subject to any disclaimer, the term of this patent is extended or adjusted under 35 U.S.C. 154(b) by 85 days.

(21) Appl. No.: 11/031,475

(22) Filed: Jan. 7, 2005

(65) Prior Publication Data

US 2006/0154800 A1   Jul. 13, 2006

(51) Int. Cl.
*C04B 35/577* (2006.01)
*C04B 35/5833* (2006.01)

(52) U.S. Cl. .................... 501/90; 501/92; 501/96.4

(58) Field of Classification Search ........... 501/90, 501/92, 96.4
See application file for complete search history.

(56) References Cited

U.S. PATENT DOCUMENTS

| | | | |
|---|---|---|---|
| 3,954,483 | A | 5/1976 | Prochazka |
| 4,080,415 | A | 3/1978 | Coppols et al. |
| 4,135,938 | A | 1/1979 | Murata et al. |
| 4,304,870 | A | 12/1981 | Rice et al. |
| 5,324,694 | A | 6/1994 | Petrak et al. |
| 5,395,807 | A | 3/1995 | Divaker et al. |
| 5,422,322 | A | 6/1995 | Chen et al. |
| 5,538,649 | A | 7/1996 | Demendi et al. |
| 5,656,563 | A | 8/1997 | Chen et al. |
| 5,707,567 | A | 1/1998 | Pfaff |
| 5,976,429 | A | 11/1999 | Chen et al. |
| 6,398,991 | B1 | 6/2002 | Brazil et al. |
| 6,716,800 | B1 | 4/2004 | Demendi et al. |
| 6,764,974 | B1 | 7/2004 | Ohji et al. |
| 6,774,073 | B1 | 8/2004 | Wilkins |
| 2001/0036894 | A1* | 11/2001 | Juma et al. ............ 501/96.4 |

FOREIGN PATENT DOCUMENTS

JP     3112866     5/1991

OTHER PUBLICATIONS

Boron Nitride Powder—A Review by: Donald A. Lelonis, et al. GE Advances Ceramics Bulletin No. 81505 (Sep. 2003).
Boron Nitride Powder—A High Performance Alternative For Solid Lubricant, by: Donald A. Lelonis, GE Advanced Ceramics Bulletin No. 81506 (Sep. 2003).

* cited by examiner

*Primary Examiner*—Karl Group
(74) *Attorney, Agent, or Firm*—Meroni & Meroni, P.C.; Charles F. Meroni, Jr.; Christopher J. Scott

(57) ABSTRACT

A ceramic composite body comprising sintered silicon carbide as major phase, dispersed boron nitride/carbon granules as minor phase, and the boron nitride/carbon granules comprise hexagonal phase boron nitride powders bonded together by glassy carbon. The composite body contains at least 3 weight percent of boron nitride, the average size of the boron nitride granules is greater than 10 micrometers, and the shape of majority of the granules is irregular. The composite body of high boron nitride loading can be further processed to improve mechanical and thermal properties by filling the porosity with glassy carbon, obtained from carbonizing glassy carbon precursor. The composite material exhibits superior thermal and tribological characteristics than monolithic silicon carbide.

4 Claims, 2 Drawing Sheets

CERAMIC COMPOSITE BODY OF SILICON CARBIDE/BORON NITRIDE/CARBON

BACKGROUND OF THE INVENTION

1. Field of the Invention

The present invention relates to the field of silicon carbide composite materials and more specifically to a dense sintered silicon carbide composite body containing hexagonal phase boron nitride and carbon.

2. Description of the Related Art

Silicon carbide is an excellent material for mechanical and chemical applications. The physical and chemical properties of sintered silicon carbide include extreme hardness, high strength at room and elevated temperatures, low thermal expansion coefficient, good thermal shock resistance, good oxidation resistance and corrosion resistance. These characteristics render silicon carbide to be used extensively in demanding applications, such as components for gas turbines, chemical pump seals and bearings, anti-wearing nozzles, high temperature furnace fixtures, etc.

Despite the superior physical and chemical characteristics, the brittleness nature of sintered silicon carbide and lack of self lubricity, which often leads to catastrophic failure in critical applications, severely limits its application as an engineering material. To overcome such drawbacks, there have been a number of investigations into making silicon carbide-boron nitride composite materials that retain silicon carbide's exceptional resistance to oxidation and heat, high strength, extreme hardness and chemical inertness, and in the same time, provide better thermal shock resistance, improve toughness and self-lubricity.

With its superior adherence and thermo-chemical stability, hexagonal boron nitride powder retains its ability to lubricate under the most severe environments. It exhibits excellent resistance to oxidation, chemical attacks and high temperature stability up to 3000° C. Boron nitride has an oxidation threshold of approximately 850° C. and, even up to 1000° C., the rate of reaction is negligible.

Incorporation of boron nitride into silicon carbide matrix enhances the resulting composite's thermal shock resistance, provides self-lubricity in tribological applications at room and elevated temperatures, improves machinability and toughness. However, due to extreme inertness nature of boron nitride, incorporating meaningful amount of boron nitride into any engineering ceramics matrix, such as silicon carbide, silicon nitride or aluminum oxide, and still achieving high densities therefore maintaining composite material's physical integrity, has not been very successful. Hence, these materials invariably are prepared by hot pressing, as described in U.S. Pat. Nos. 3,954,483, 4,304,870 and 5,324,694. But hot pressing is an extremely expensive process and is only useful for producing simple shapes and has very limited commercial applications. Other methods of processing such material include in-situ reaction sintering, as disclosed in U.S. Pat. No. 6,764,974 and reaction bonding, as disclosed in U.S. Pat. No. 6,398,991. But these processes have severe limitations too. Reaction sintering is a slow and costly chemical process, and is not suitable for mass production. Reaction bonding results in a composite body that contains free silicon, thus limits its high temperature applications and has poor corrosion resistance.

To take full advantage of lubricating capability of boron nitride in silicon carbide body, the end products, such as seals or bearings, are usually machined to a very smooth surface, and in many cases, to mirror finish. It becomes very critical whether boron nitride inclusions in the sintered body can be retained on the surface during these material removal processes. Furthermore, the end products are often used in the most severe environments, subjecting to extreme heat, pressure, high speed erosion and chemical attack, therefore retaining boron nitride inclusions on the rubbing surface become even more difficult. Thus the bonding between powders that make up the granules, and the bonding of granules to the silicon carbide matrix become critical. U.S. Pat. No. 6,774,073 describes a process that uses temporary fugitive binder, such as polyvinyl alcohol, to prepare a dry lubricant(graphite) and fugitive binder mixture that is essentially spherical in shape, and then mix with silicon carbide. But such approach has severe consequences, during sintering, the fugitive binders evaporate, leaving no bonding force between the fine dry lubricant powders that make up the granules, and between the granules and the silicon carbide matrix. This is further illustrated in U.S. Pat. No. 5,395,807, wherein fugitive polymer spheres are used to create "controlled porosity" in sintered silicon carbide, and in U.S. Pat. No. 5,707,567, wherein polypropylene beads are used to create open porosities. Other important factors are the shape and surface morphology of boron nitride granules. During machining process to prepare the end use of the composite body, granules that have smooth surfaces are most likely to be pulled out of the matrix, while irregular, multi-faceted granules that have strong bonding within powders that make up granules are more likely to remain in the matrix and provide long term lubricating effects.

Thus, there exists a need for a dense silicon carbide body containing substantial amount of boron nitride that can be simply pressureless sintered. Furthermore, boron nitride incorporated should have good adhesion in the sintered body, thus during manufacturing process, or in actual rubbing applications under severe conditions, surface boron nitride can be retained.

SUMMARY OF THE INVENTION

The invention disclosed and claimed herein comprises a composite body of silicon carbide having carbon-bonded, hexagonal phase boron nitride granules dispersed throughout. Boron nitride loadings as high as 30 weight percent, can be incorporated into silicon carbide without detrimental effects on the sintered body. The processes for producing such a composite body include preparing boron nitride granules containing glassy carbon precursors, preparing a premix of silicon carbide containing typical sintering aids such as boron carbide and binder such as phenolic resin. The premix of silicon carbide and boron nitride granules are mixed thoroughly and then pressed to shape, sintered to form desired composite body. The process for preparing boron nitride granules includes mixing boron nitride powder with glassy carbon precursors such as phenolic resin, furfuryl alcohol resin or furan resin, drying and curing the mixtures, crushing, milling and screening to obtain the desired size of granules. In one aspect, the sintered composite body contains substantial amount of boron nitride, has high density and strength, and is impervious. In another aspect, the composite body contains large amount of boron nitride and exhibits good lubricity and dry running capability, but may be slightly porous. The porous body can be further impregnated with glassy carbon precursor, such as furfuryl alcohol resin, furan resin, and liquid phenolic resin to close the inter-connected porosities. The impregnated body is cured and carbonized to temperatures above 600° C., further enhancing mechanical, chemical and tribological characteristics. The impregnation and carbonization process can be repeated until the composite material becomes impervious. The size of the boron nitride/carbon granules in the sintered body is between 10 to 400 micrometers, and the shape of the granules is highly irregular. The rough surface of the granule, combined with strong bonding of glassy carbon, helps retaining boron nitride on the surface of composite body during material making and during actual rubbing applications. The composite material has a density of at least 80 percent of theoretical density, as determined by the rule of mixture for a composite material.

DESCRIPTION OF THE PREFERRED EMBODIMENT(S)

According to the present invention, substantial amount of hexagonal phase boron nitride powders can be incorporated into a silicon carbide body. Furthermore, to produce such a body, a simple, pressureless sintering process is utilized. The existence of boron nitride in the sintered body is in granular form, comprising boron nitride powders bonded together by strong glassy carbon. The shape of the boron nitride/carbon granules is highly irregular, with multi-faceted surface morphology to help locking boron nitride in the composite body. Two methods of introducing glassy carbon to the system are disclosed. One is to prepare boron nitride/glassy carbon precursor mixture prior to adding to silicon carbide premix. The other method, used when the as-sintered body contains small amount of inter-connected porosity, is to impregnate the sintered body with liquid glassy carbon precursor, such as furfuryl alcohol resin, furan resin and phenolic resin, and then carbonize the resulting body. The composite body thus produced has a number of characteristics superior than monolithic silicon carbide, including self-lubricity, better thermal shock resistance, toughness and machinability. Comparing with sintered silicon carbide/graphite composite materials, the composite body of present invention is more suitable for high temperature structural and tribological applications, especially under vacuum, oxidizing, or/and extreme pressure.

The composite body comprises silicon carbide and typical sintering aids such as boron and carbon, and between 3 to 40 weight percent of boron nitride. The percentage ratio of boron nitride and silicon carbide can be tailored to achieve specific characteristics of the resulting composite body. Higher boron nitride content leads to lower strength, but better lubricity and dry running survivability. However, to maintain a minimum strength, the composite body should have a density of at least 80 percent of the theoretical density and preferably 90 percent.

Figure 1:
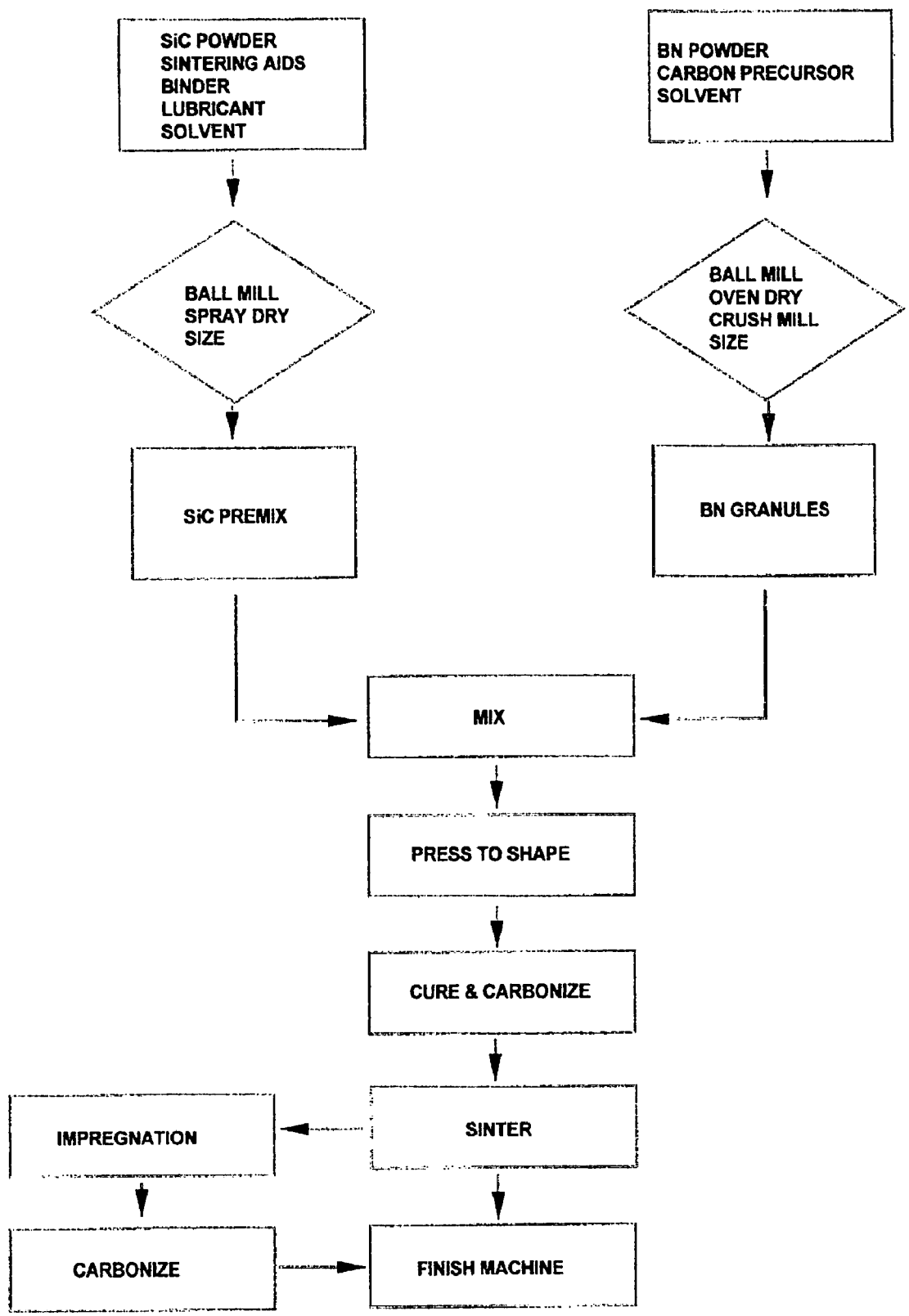
FIG. 1 is a schematic flow diagram illustrating the process for producing a composite body according to the present invention.

Referring to FIG. 1, an exemplary method for producing a silicon carbide composite body containing boron nitride/carbon will be described in detail. Silicon carbide premix and boron nitride granules are prepared separately, using different processes. They are mixed thoroughly together in various proportions, using a V-shape blender, and then pressed to shape using die pressing or isostatic pressing. The shaped body is heated in an oven to about 600° C., under inert atmosphere such as nitrogen or argon, to carbonize the glassy carbon precursor into carbon. Next, the composite body is sintered in a high temperature vacuum sintering furnace at temperatures above 2100° C., under inert atmosphere such as argon or helium.

To achieve the object of the present invention, boron nitride powder is encapsulated in glassy carbon precursor, such as phenolic resin, furan resin, or furfuryl alcohol resin, forming boron nitride/resin granules, prior to mixing with silicon carbide. There are several advantages of using boron nitride/resin granules instead of virgin boron nitride powders. First, it helps dispersing boron nitride into silicon carbide by modifying non wetting and graphitic nature of boron nitride powders, thus a more uniform and dense green body can be obtained. The second advantage is that upon heating, resin decomposes at low temperatures into glassy carbon, bonding boron nitride powders together, forming strong granules in the sintered body that will withstand high speed, high pressure rubbing during critical high temperature applications. Another advantage is that glassy carbon precursors are thermal setting resins, once set, they are extremely hard and brittle, and during crushing and milling, they tend to break into particles that are highly irregular and have very rough surface. This increases the possibilities that boron nitride granules will remain on the surface of the sintered body. Lastly, when resin carbonizes into carbon, there is about sixty volume percent shrinkage associated with the conversion, and it occurs at low temperatures well below densification temperatures of silicon carbide, therefore creating sufficient voids in between boron nitride granules and silicon carbide matrix, facilitating the densification of the silicon carbide matrix which occurs at higher temperatures.

Glassy carbon derives from thermal set resin has outstanding physical and mechanical properties. Glassy carbon is a form of pure carbon produced by thermal decomposition of a three-dimensionally cross-linked polymer. It has a high flexural strength. The zero open porosity gives a low permeability to gases. Glassy carbon has excellent resistance to a wide range of aggressive chemical environments. In the composite body of the present invention, resin to glassy carbon conversion is under less than ideal conditions, since boron nitride is dispersed in the resin and the granules are confined in a ceramic matrix. Inevitably, the resulting glassy carbon is less dense than monolithic glassy carbon. Nevertheless, it still provides strong bonding between boron nitride powders. This is similar to the bonding in mechanical carbon graphite, which is used extensively as good self lubricating rubbing materials.

To prepare boron nitride granules, hexagonal phase boron nitride powder is carefully selected. High temperature synthesized boron nitride, which has high degree of crystallinity and high purity, is preferred. These powders exhibit low coefficient of friction, good oxidation resistance and high temperature resistance. Boron nitride powder can be obtained from a number of commercial sources, including General Electric Company's Advanced Ceramic Division, and Saint Gobain's Boron Nitride Division.

Glassy carbon precursor, such as liquid phenloic resin, furfuryl alcohol resin or furan resin, can be mixed with born nitride powder directly. Suitable solvents, such as alcohol or acetone, can also be added during mixing to facilitate dispersing boron nitride powder. When solid resin is used, such as powdered phenolic resin, the resin is first dissolved in organic solvent such as alcohol or acetone, and then boron nitride powder is added to form a slurry, typically at 40 percent solid loading. The mixture is then ball milled. The slurry is subsequently dried, typical in a vacuum drying oven, to temperatures above curing temperature of the resin, typically at 150° C. The dried agglomerates are then crushed, milled using a high speed hammer mill, then sieved through a screen, typically 100 mesh, to form granules. The weight percent of the resin in the boron nitride granules is higher than 5 percent, typically higher than 10 percent, sufficient to encapsulate boron nitride powders. The shape of the resulting granules is highly irregular, after crushing and milling extremely hard agglomerates formed during curing. The size of the boron nitride granules is preferably smaller than 150 micrometers, larger granules in sizes up to 400 micrometers can also be used. Granules larger than 400 micrometers are not suitable since they will cause lamination and poor densification. Granules smaller than the size of the silicon carbide grains, typically 10 micrometers, are not suitable either, since they have minimum effects on the characteristics of the sintered body.

The preparation of silicon carbide premix for sintering is a well known art. For the present invention, the formulation includes sub-micrometer alpha phase silicon carbide powder, boron carbide powder as sintering aid, phenolic resin as binder and carbon source, and oleic acid as die lubricant. Beta phase or combination of alpha and beta phase silicon carbide powders can also be used. The particle size of silicon carbide powder must be very small, with average size below 2 micrometers, preferably below 1 micrometer, and surface area above 5 square meters per gram. The silicon carbide powder must also be at least 97 percent pure, free from major metallic impurities and low in oxygen content. Typically, boron carbide is used as sintering aid for solid state sintering of silicon carbide, other known sintering aids include aluminum, beryllium and compounds thereof. The amount of sintering aids needed is usually between 0.5 to 5 weight percent. Carbon is also known to be a necessary aid in promoting sintering, reducing surface oxygen on fine silicon carbide powders. Phenolic resin is generally used as a preferred binder and carbon source, upon heating it decomposes into free carbon on the surface of silicon carbide powders. Solid or liquid phenolic resin, or mixture thereof, can be used. The amount of phenolic resin needed depends on the oxygen content of silicon carbide powder, and 3 to 10 weight percent is usually sufficient.

The preparation of silicon carbide premix follows a typical engineering ceramic process. Silicon carbide powder, boron carbide powder, phenolic resin, oleic acid is mixed with distilled water or organic solvent such as ethanol to form a slurry, typically at 40 percent solid loading, then ball milled to produce a well dispersed slurry. To minimize contamination, the ball mill is lined with rubber and the balls used for milling are silicon carbide. The slurry is subsequently dried, either by spray drying or pan drying in an oven, then sized through a screen, typically 100 mesh, to form the powder premix The next step in the process is to form a green body. Premix of silicon carbide and boron nitride granules are mixed thoroughly in a blender, typically a V-shape blender, then molded into a desired shape, using die-pressing or isostatic pressing. The ratio of silicon carbide premix and boron nitride/resin granules can be tailored to achieve specific characteristics of desired sintered composite body. Typically, at least 3 weight percent of boron nitride/resin granules are added to silicon carbide premix, preferably 10 weight percent and above is used to ensure that enhanced thermal and tribological properties of the sintered body will be achieved. The formed green body can be machined prior to sintering, using varieties of tools such as lathe or mill.

Referring to FIG. 1, the next step in the process is to carbonize the glassy carbon precursor. During carbonizing, both temperature and atmosphere in the furnace must be carefully controlled. The green body must be heated in an inert atmosphere, such as nitrogen, argon or helium to prevent oxidation of carbon or silicon carbide, and the heating rate should be no more than 1 degree Celsius per minute to minimize micro-cracking, thus forming a strong glassy carbon between boron nitride powders. The peak temperature for carbonization is preferably 600° C.

The carbonized green body is then sintered in a vacuum sintering furnace. Typical sintering cycle of making monolithic silicon carbide can be used. The heating rate depends on the size of the parts, and typically, an eight hour cycle to about 2100° C. is used. The sintering atmosphere can be vacuum, full or partial pressure of argon or helium, and partial pressure of the inert atmosphere is preferred. The usual holding time at the peak sintering temperature is one hour.

Both density and water absorption are measured on the sintered body. Density is calculated by measuring weight and volume. Water absorption is calculated by measuring wet weight of the sintered body after boiling in water for 30 minutes. The percent water pick-up is a good indicator of the open porosity of the sintered body. As shown in the following examples, sintered body containing up to 10 weight percent of boron nitride/carbon shows no water absorption, hence the sintered body has no open porosity.

When high degree of self-lubricity is desired, high boron nitride content, typically more than 10 percent, can be used and relatively dense body can be obtained. The small amount of open porosities in the sintered body can be filled up by vacuum-pressure impregnation, using liquid glassy carbon precursor, such as furfuryl alcohol resin, furan resin and phenolic resin. Typically, the as-sintered body is placed in a pressure tank and evacuated to a vacuum level lower than 1torr, and then liquid resin is introduced into the tank, totally immerse the composite body and the tank is pressurized to about 100 psi and kept under pressure for a period of time. The impregnated body can be carbonized to further improve the temperature capability, and the process can be repeated if necessary until the sintered body is impervious.

EXAMPLE 1

Control Experiment 1

A premix for making sintered silicon carbide was made according to the following composition:

| Ingredient | Weight Percent |
| --- | --- |
| Silicon carbide | 91.2 |
| Boron carbide | 0.8 |
| Phenolic resin | 5.0 |
| Oleic acid | 3.0 |

The silicon carbide used was high purity, sub-micron sinterable powder, obtained from Xinfang Abrasives Company, China. The average particle size of the powder was about 0.7 micrometer. The as-received silicon carbide contained about 0.8 weight percent of boron carbide sintering aids already added in the powder. The powder was mixed proportionally with phenolic resin, oleic acid and distilled water to form slurry containing 40 percent solids, and then milled for 4 hours in a rubber lined ball mill using silicon carbide balls. The slurry was then spray dried into moldable granules. The spray-dried silicon carbide powder was pressed to shape in a die, under a pressure of 12 ton per square inch, and then the green body was cured at 150° C. for 4 hours, heated in a furnace to 600° C. at a heating rate of 60° C. per hour under nitrogen flow, to decompose the temporary binders and carbonize phenolic resin. The pre-fired body is then sintered in a vacuum sintering furnace, to temperatures up to 2100° C. over a period of 8 hours, under argon atmosphere. After sintering, the ceramic body density was calculated by measuring weight and volume to be 3.15 g/cc, which corresponds to about 98% of theoretical density of silicon carbide(3.21 g/cc), thus it was established that the silicon carbide premix as prepared is highly sinterable.

EXAMPLE 2

Control Experiment 2

Hexagonal phase boron nitride powder, grade CTL30, was obtained from Saint Gobain Advanced Ceramics Corporation. The average size of the powder was 10.3 micrometers and the maximum size was 62.0 micrometers. The powder contained less than one percent oxygen. The spray-dried silicon carbide premix prepared in Example 1 and as-received boron nitride powder, in various ratios, was mixed thoroughly in a per square inch, and then the green body was cured at 150° C. for 4 hours, heated in a furnace to 600° C. at a heating rate of 60° C. per hour under nitrogen flow, to decompose the temporary binders and carbonize phenolic resin. The pre-fired body is then sintered in a vacuum sintering furnace, to temperatures up to 2100° C. over a period of 8 hours, under argon atmosphere. After sintering, the composite ceramic body density was calculated by measuring weight and volume. Samples were boiled in hot water for 30 minutes, and then weighted to measure the water absorption. The following table shows the results:

| BN Weight Percent | Density, g/cc | Water Absorption, % |
|---|---|---|
| 5 | 3.01 | 0 |
| 10 | 2.89 | 0 |
| 15 | 2.74 | 0.2 |
| 20 | 2.61 | 5 |

Figure 2:
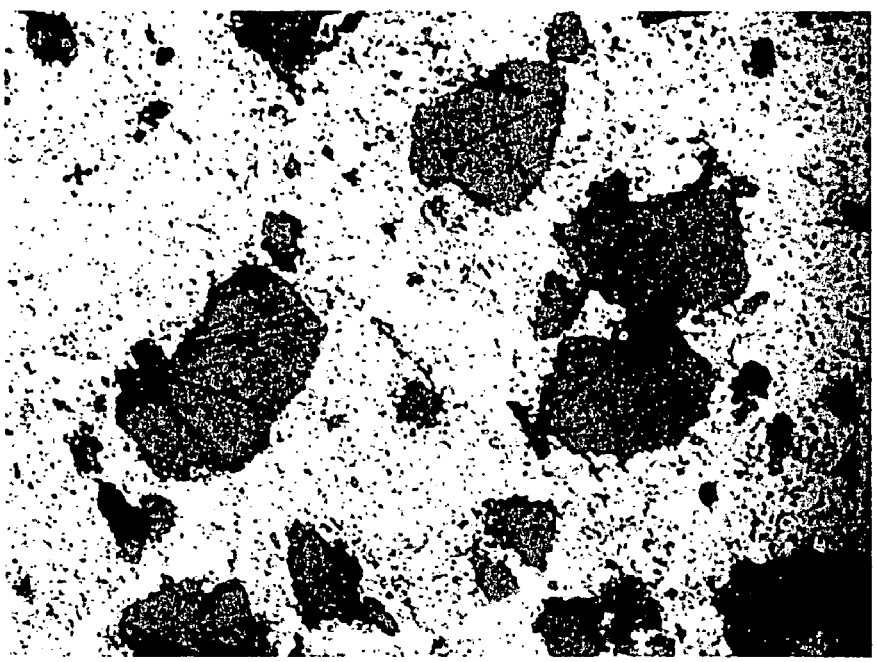
FIG. 2 is an optical photomicrograph taken at 150x, of a polished surface of as-sintered, impervious composite body in accordance with the present invention.

The results shown above clearly demonstrated the advantages of present invention. Samples prepared using boron nitride/resin granules achieved very high densities at high boron nitride loadings. Samples containing as high as 10 weight percent boron nitride/carbon granules had no open porosity, measured by the water absorption method, and the resulting sintered composite body had high strength and excellent polish ability. FIG. 2 is an optical photomicrograph taken at 150 magnifications, of a polished surface of as-sintered, impervious composite body containing 10 weight percent boron nitride/carbon granules evenly incorporated into the matrix. The photomicrograph clearly indicated the silicon carbide matrix was highly dense, and there is no evidence of micro-cracking or laminations. The shape of the boron nitride/carbon granules was highly irregular, defined by sharp and multi-faceted edges shown on the cross-section.

EXAMPLE 4

Figure 3:
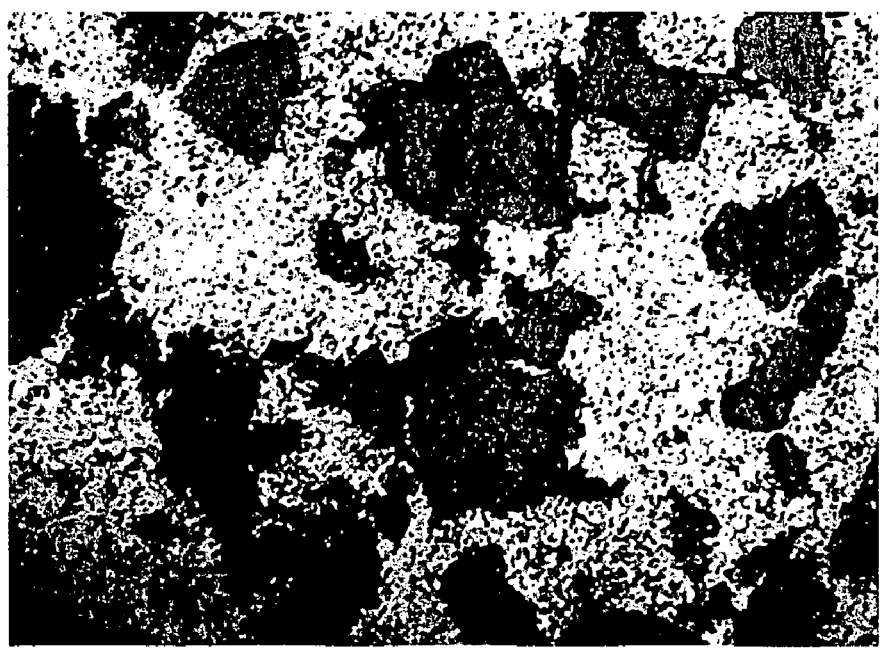
FIG. 3 is an optical photomicrograph taken at 150x, of a polished surface of a composite body, wherein the interconnected porosities are filled with glassy carbon, according to the present invention.

A composite body was prepared using identical process as in Example 3, except the weight percent of the resin-boron nitride granules in the raw batch was 20 weight percent. The resulting composite body had a density of 2.61 g/cc and water adsorption of 5 percent. To fill the open porosity in the body, the composite body was placed in a pressure tank, vacuumed to 1 torr and then filled with furfuryl alcohol resin, pressurized to 100 psi using compressed air, and kept under pressure for 24 hours. The impregnated body picked up 4.2 percent furfuryl alcohol resin, measured by the weight gained. The resulting body was cured in an air convection oven at 150° C. for 4 hours, heated in a furnace to 600° C. at a rate of 60° C. pre hour under nitrogen flow to carbonize the furfuryl alcohol resin. FIG. 3 is an optical photomicrograph taken at 150 magnifications, of a polished surface of the composite body, wherein the inter-connected porosity is filled with glassy carbon. The photomicrograph clearly indicated the silicon carbide matrix filled with small amount of glassy carbon was highly dense, and there is no evidence of micro-cracking or laminations. The shape of the boron nitride/carbon granules was highly irregular, defined by sharp and multi-faceted edges shown on the cross-section.

The invention is not to be limited by what has been shown and described in detail, except as indicated in the claims.

The invention claimed is:

1. A ceramic composite body comprising
   (a) sintered silicon carbide matrix
   (b) between 3 to 20 weight percent of dispersed boron nitride/carbon granules comprising hexagonal boron nitride powder bonded together by carbon.

2. The composite body of claim 1, wherein the average size of the boron nitride/carbon granules is greater than 10 micrometers.

3. The composite body of claim 1, wherein the carbon in the boron nitride/carbon granules is glassy carbon.

4. The composite body of claim 1, wherein the composite body comprises between 0.5 to 5 weight percent of sintering aids, selected from the group consisting of boron, aluminum, beryllium, carbon, compounds thereof and mixtures thereof.

* * * * *